Patented Mar. 2, 1937

2,072,825

UNITED STATES PATENT OFFICE 2,072,825

CONDENSATION PRODUCTS FROM HYDROXYLATED CYCLIC COMPOUNDS AND ACETYLENE

Walter Reppe and Ernst Keyssner, Ludwigshafen-on-the-Rhine, Germany, assignors to I. G. Farbenindustrie Aktiengesellschaft, Frankfort-on-the-Main, Germany No Drawing. Application June 30, 1933, Serial No. 678,478. In Germany July 9, 1932

12 Claims. (Cl. 260—2)

The present invention relates to condensation products of hydroxylated cyclic compounds and acetylene and process of producing the same.

It is already known that the treatment of phenol, cresols or other phenolic bodies with acetylene in the presence of inorganic mercury salts or mercury oxide and strong inorganic acids, if desired in the presence of organic solvents, leads to the formation of resinous products which contain the components in the ratio of 1 molecular proportion of acetylene to 2 molecular proportions of phenol. In this reaction acetaldehyde is formed as intermediate product. It has also been proposed to fix the mercury salt or oxide and the strong inorganic acid, for example sulphuric acid, on inert porous substances, such as diatomaceous earth or active carbon, in order to render more easy the removal of the catalyst from the resinous products obtained. The field of employment of these resins is, however, restricted if they are not subsequently subjected to a hardening with aldehydes. Under the same conditions, resorcinol does not yield a resin but crystalline products.

We have now found that valuable condensation products are obtained by causing acetylene to act at temperatures between about 100° and about 300° C., preferably at from 170° to 220° C., on mono- or polyhydric hydroxy compounds of the mono- or poly-, iso- or heterocyclic series, or mixtures of such compounds, in the presence of organic zinc or cadmium salts, as for example zinc or cadmium salts of acetic acid, propionic acid, butyric acid, oleic acid or abietic acid. Since water retards reaction, it is advisable to carry out the reaction in the absence of water or at least to keep the water content of the reaction mixture low.

As suitable cyclic hydroxy compounds may be mentioned aromatic compounds such as phenols, the cresols, xylenols, polyhydric phenols, as for example resorcinol, naphthols and other isocyclic compounds, such as partially hydrogenated aromatic or cycloaliphatic compounds containing hydroxyl groups, as for example tetrahydronaphthol and cyclohexanol, or heterocyclic compounds such as hydroxylated pyridine, quinoline and methyl quinoline, or halogenation and sulphonation products of said hydroxy compounds, such as for example chlorinated phenol or sulphonic acids of phenol.

If desired the reaction may be carried out in the presence of solvents, as for example alcohols, such as methanol, ethanol or butanol, or ketones, such as acetone or methyl ethyl ketone, or esters, as for example ethyl acetate or butyl acetate, or hydrocarbons of the aliphatic, aromatic or hydroaromatic series, such as benzine, benzene, toluene or tetra- or deca-hydronaphthalene; furthermore, substances which form liquid or solid solutions with the initial materials and/or the condensation products or which serve merely as fillers may also be added during the condensation, as for example waxes, oils, resins, resin esters, asbestos, cellulose and its derivatives, gypsum and like fillers.

The reaction may be carried out at atmospheric or, advantageously, at increased pressure, discontinuously (in stirring autoclaves) or continuously (in a pressure tower) and may either be carried to complete saturation or interrupted prematurely. When working under increased pressure, it must be kept in mind that acetylene under pressure is liable to explode. It is, therefore, advisable when working under increased pressure to dilute the acetylene with an inert gas, for example nitrogen.

Depending on the temperature, amount of catalyst and duration of reaction employed, viscous, semi-hard or hard products are obtained which are readily soluble, partly soluble or only capable of swelling in organic solvents, such as acetone, alcohol, ether and benzene, and in oils and aqueous caustic alkalies.

The condensation products obtainable in the said manner may be employed either directly or after previous purification in the preparation of lacquers and insulating agents and in the artificial material industries. For the purpose of purification, the resin may be dissolved in a solvent, as for example alcohol or benzene, the solution treated with bleaching earth, active carbon or a chemical bleaching agent, as for example hydrosulphite, filtered and distilled at atmospheric or reduced pressure, any phenol which has not been converted being distilled off at the same time. The product purified in this manner is practically free from zinc or cadmium compounds. Alternatively, any unconverted phenol present may be expelled by means of wet or superheated steam before the dissolution in organic solvents. In cases when the products are still soluble in aqueous alkali, it is possible to purify them by dissolution in alkali and precipitation by means of acids. The soluble and the insoluble products may also be purified in a finely ground condition by treatment with acids or alkalies, dilute aqueous solutions of caustic alkali being employed for purifying products which are insoluble in caustic alkali solutions, and aqueous solutions of alkali metal carbonates being suitable for the treatment both of the insoluble and of the soluble products.

The condensation products may be subjected to a subsequent hardening with aldehydes or substances which split off aldehydes, as for example hexamethylene tetramine. Catalysts, such as sulphuric acid, organic sulphonic acids from aliphatic or aromatic compounds, resinic acids, fatty acids, aqueous caustic alkalies or organic bases, such as cyclohexylamine may be added during this process if desired. Similarly solvents of low or high boiling point may be present during the hardening, in which case the employment of organic bases as catalyst is especially favorable, the solvents of high boiling point being left in the hardened products if desired. Moreover filling materials, such as asbestos fibres, gypsum or wood powder, may be added before the hardening which remain finely divided in the finished product; or substances may be added which enter into solid solutions with the finished product, for example cellulose ethers, polymerization products, as for example polymerized vinyl esters, polymerized styrene, polymerized acrylic acid and their derivatives, artificial or natural resins and resin esters, a far reaching influence on the properties of the final products thus being possible.

New products are also obtained by a complete or partial esterification of the condensation products with organic, saturated or unsaturated, lower or higher acids, such as fatty acids, aromatic acids, hydroxy acids, ether acids, as for example diglycollic acid, amino acids or polybasic acids, as for example phthalic acid, succinic acid, adipic acid, suberic acid, citric acid or tartaric acid or mixtures of these acids.

The condensation products may also be sulphonated (products having the character of tanning agents being obtained), nitrated, chlorinated, coupled with diazo compounds or converted into the corresponding glycol ethers by treatment with ethylene oxide.

For causing the phenol groups to react, the alkali salts of the phenol resins may be employed; these salts may be brought into reaction with halogen compounds, such as methyl iodide, chlorhydrins, chloracetic acid or acid chlorides, or with dimethyl or diethyl sulphate.

The following examples will further illustrate the nature of this invention but the invention is not restricted to these examples. The parts are by weight.

Example 1

1000 parts of phenol and 20 parts of zinc acetate are introduced into a stirring autoclave. The autoclave is freed from air by means of nitrogen, then filled with nitrogen until the pressure is 5 atmospheres, acetylene finally being pressed in until the pressure is 10 atmospheres. The nitrogen is for the purpose of avoiding explosions. The whole is heated to 180° C., the pressure in the autoclave thus increasing to from about 20 to 25 atmospheres. When the reaction has commenced and the pressure has consequently subsided to a few atmospheres, acetylene is again pressed in. This procedure is repeated until from 240 to 260 parts of acetylene have been absorbed. The reaction product may be allowed to run out while hot or may be withdrawn cold. A hard resin is thus obtained which is soluble in organic solvents, such as acetone, ether, alcohol and benzene, and in caustic soda, but insoluble in benzine and oil of turpentine.

In order to remove zinc from the reaction product the latter is dissolved in 3000 parts of benzene while heating and stirred with 160 parts of bleaching earth. The bleaching earth is then filtered off and the benzene distilled at first at a slightly reduced pressure and finally in a vacuum of from 15 to 20 millimeters (mercury gauge), the temperature being raised slowly to 230° C. Towards the end of the distillation, the unconverted phenol contained in the crude product passes over. The resin is poured out from the distillation vessel while still hot. After cooling it forms hard clear pieces having a softening point of from 100° to 130° C. depending on the periods of heating applied in the process.

Subsequent hardening of the product may be effected as follows:—

A mixture of 100 parts of the powdered resin with 10 parts of hexamethylene tetramine is slowly heated to 200° C. When the evolution of gas which takes place has subsided, the product is allowed to cool. A very hard difficultly fusible resin is obtained which is insoluble in alkali and the usual organic solvents.

The esterification of the said resin having a melting point of from 100° to 110° C. may be effected as follows.

120 parts of the resin are mixed with 94 parts of linoleic acid and slowly heated to 200° C. The water split off distils off. When the reaction is completed the whole is allowed to cool. A soft resin is obtained which is still soluble in alkali since only one third of the theoretical amount of linoleic acid has been employed for the esterification. The aqueous alkaline solutions of the product have great foaming power.

The following is an example of the reaction of the alkali metal salt of the phenol resin:

120 parts of the purified resin having a softening point of 110° C. are dissolved together with 40 parts of caustic soda in 320 parts of alcohol while heating. 80 parts of ethylene chlorhydrin are then introduced. Sodium chloride separates immediately and is filtered off. By distilling off the alcohol and taking the residue up in benzene, any sodium chloride still present may be removed. After distilling off the benzene in vacuo, during which the temperature is raised slowly to 270° C., a resin is obtained which no longer dissolves in caustic soda solution and the softening point of which has been increased to 120° C.

Example 2

1000 parts of phenol, 10 parts of zinc acetate and 10 parts of cadmium acetate are treated with about 230 parts of acetylene as described in Example 1. The resulting reaction product is purified by dissolution in benzene and treatment with bleaching earth as described in Example 1. After distilling off the benzene, a resin is obtained having a softening point of 128° C.

Example 3

1000 parts of phenol and 20 parts of cadmium acetate are treated with acetylene as described in Example 1, until the reaction product has absorbed 300 parts of acetylene. A semi-soft resin is obtained which is readily soluble in benzene and acetone but insoluble in alcohol and caustic soda solution.

Example 4

1000 parts of cresol and 40 parts of zinc acetate are treated with about 200 parts of acetylene and purified as described in Example 1. A resin is obtained which is very similar to the product obtained from phenol but which dissolves in oil of turpentine.

If, instead of cresol, commercial xylenol be employed, a resin is obtained which is also soluble in ligroin.

*Example 5*

A mixture of 520 parts of o-chlorphenol and 20 parts of zinc acetate are treated as described in Example 1 until saturated with acetylene which is the case after absorption of about 235 parts of acetylene. A dark resin is obtained which is insoluble in alcohol and caustic soda solution, but soluble in benzene, acetone and ether.

When treating p-chlorphenol with acetylene in the same manner, the mixture is already saturated after the absorption of 140 parts of acetylene. The product resembles the resin obtained from o-chlorphenol, but is soluble in alcohol.

*Example 6*

100 parts of 4-hydroxydiphenyl and 6 parts of zinc acetate are treated in a shaking autoclave with acetylene at 190° C. as described in Example 1 until about 17 parts of acetylene are absorbed. The product obtained is a resin having a softening point of about 135° C. and is readily soluble in fatty oils while warming.

*Example 7*

100 parts of tertiary p-butylphenol and 10 parts of zinc acetate are treated with acetylene at 210° C. in a shaking autoclave as described in Example 1 until the absorption of acetylene takes place but slowly. Thus about 15 parts of acetylene are absorbed. A clear resin is thus obtained which after purification with bleaching earth has a softening point between about 95 and 100° C. and is soluble in benzine.

*Example 8*

100 parts of resorcinol and 6 parts of zinc acetate are treated between about 180° and 190° C. with acetylene as described in Example 1 until about 20 parts of acetylene are taken up. A brown red resin is obtained which is insoluble in benzene and benzine, but readily soluble in caustic soda solution, alcohol and acetone.

By treating α-naphthol with acetylene in the same manner a dark resin is obtained which is readily soluble in benzene and acetone, partly soluble in alcohol and caustic soda solution and soluble in benzine only in the hot.

*Example 9*

100 parts of dihydroxy - diphenyl - dimethyl - methane and 5 parts of zinc acetate are acted upon with acetylene at about 190° C. in a shaking autoclave as described in Example 1 until from 10 to 11 parts of acetylene are taken up. A resin is obtained having a softening point of 130° C. which is insoluble in benzene and benzine but soluble in acetone and alcohol.

*Example 10*

1000 parts of tetrahydro-β-naphthol and 40 parts of zinc acetate are treated with acetylene at between 180° and 190° C. in a stirring autoclave as described in Example 1 until about 110 parts of acetylene are absorbed. The resin thus obtained has a softening point of about 106° C. and is soluble in benzine.

What we claim is:—

1. The process of producing condensation products which comprises causing acetylene to act at a temperature between about 100° and about 300° C. on a hydroxylated cyclic compound in the presence of a zinc or cadmium salt of a carboxylic acid.

2. The process of producing condensation products which comprises causing acetylene to act at a temperature between about 170° and about 180° C. on a hydroxylated cyclic compound in the presence of a zinc or cadmium salt of a carboxylic acid.

3. The process of producing condensation products which comprises causing acetylene under increased pressure to act at a temperature between about 100° and about 300° C. on a hydroxylated cyclic compound in the presence of a zinc or cadmium salt of a carboxylic acid.

4. The process of producing condensation products which comprises causing acetylene to act at a temperature between about 100° and about 300° C. on a hydroxylated cyclic compound in an inert organic solvent in the presence of a zinc or cadmium salt of a carboxylic acid.

5. Resinous products obtainable by condensation of one molecular proportion of a hydroxylated cyclic compound and at least one molecular proportion of acetylene at a temperature between about 100° and about 300° C. in the presence of a zinc or cadmium salt of a carboxylic acid.

6. The resinous product obtainable by condensation of one molecular proportion of phenol and at least one molecular proportion of acetylene at a temperature between about 100° and about 300° C. in the presence of a zinc or cadmium salt of a carboxylic acid, the product being soluble in acetone and alcohol and in caustic soda solution and insoluble in benzine.

7. The resinous product obtainable by condensation of one molecular proportion of p-butylphenol and at least one molecular proportion of acetylene at a temperature between about 100° and about 300° C. in the presence of a zinc or cadmium salt of a carboxylic acid, the product being soluble in benzine.

8. The resinous product obtainable by condensation of one molecular proportion of dihydroxy-diphenyl-dimethyl - methane and at least one molecular proportion of acetylene at a temperature between about 100° and about 300° C. in the presence of a zinc or cadmium salt of a carboxylic acid, the product being soluble in acetone and alcohol, insoluble in benzene and benzine.

9. Resinous products obtainable by condensation of one molecular proportion of a hydroxylated cyclic compound and at least one molecular proportion of acetylene at a temperature between about 100° and about 300° C. in the presence of a zinc or cadmium salt of a carboxylic acid under increased pressure.

10. The resinous product obtainable by condensation of one molecular proportion of phenol and at least one molecular proportion of acetylene at a temperature between about 100° and about 300° C. in the presence of a zinc or cadmium salt of a carboxylic acid under increased pressure, the product being soluble in acetone, alcohol and in caustic soda solution and insoluble in benzine.

11. The resinous product obtainable by condensation of one molecular proportion of p-butylphenol and at least one molecular proportion of acetylene at a temperature between about 100° and about 300° C. in the presence of a zinc or cadmium salt of a carboxylic acid under increased pressure the product being soluble in benzine.

12. The resinous product obtainable by condensation of one molecular proportion of dihydroxy-diphenyl-dimethyl-methane and at least one molecular proportion of acetylene at a temperature between about 100° and about 300° C. in the presence of a zinc or cadmium salt of a carboxylic acid under increased pressure, the product being soluble in acetone and alcohol, insoluble in benzene and benzine.

WALTER REPPE.
ERNST KEYSSNER.